United States Patent
Haririnia et al.

(10) Patent No.: US 10,572,835 B2
(45) Date of Patent: Feb. 25, 2020

(54) MACHINE-LEARNING ALGORITHM FOR TALENT PEER DETERMINATIONS

(71) Applicant: Microsoft Technology Licensing, LLC, Redmond, WA (US)

(72) Inventors: Amin Haririnia, San Francisco, CA (US); Sebastian Predescu, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 15/648,925

(22) Filed: Jul. 13, 2017

(65) Prior Publication Data

US 2019/0019116 A1    Jan. 17, 2019

(51) Int. Cl.
*G06Q 10/06* (2012.01)
*G06Q 10/10* (2012.01)
*G06Q 30/00* (2012.01)

(52) U.S. Cl.
CPC ....... *G06Q 10/06* (2013.01); *G06Q 10/06393* (2013.01); *G06Q 10/101* (2013.01); *G06Q 10/105* (2013.01); *G06Q 30/018* (2013.01)

(58) Field of Classification Search
CPC .... G06Q 50/01; G06Q 10/067; G06Q 30/018; G06Q 30/0202; G06N 20/00; G06N 7/005; G06N 5/02
See application file for complete search history.

(56) References Cited

U.S. PATENT DOCUMENTS

| | | | |
|---|---|---|---|
| 2014/0214945 A1* | 7/2014 | Zhang | H04L 67/306 709/204 |
| 2014/0279299 A1* | 9/2014 | Erenrich | G06Q 40/10 705/30 |
| 2016/0321678 A1* | 11/2016 | Wong | G06Q 30/0201 |
| 2017/0091270 A1* | 3/2017 | Guo | G06F 16/58 |
| 2018/0082183 A1* | 3/2018 | Hertz | G06Q 10/10 |
| 2018/0144256 A1* | 5/2018 | Saxena | G06N 20/00 |

OTHER PUBLICATIONS

LinkedIn Help "Premium Insights on Comapny Pages—Overview," Jan. 21, 2017, pp. 1-2, https://web.archive.org/web/20170121125550/https://www.linkedin.com/help/linkedin/answer/69626.*
Johnson, Clayton, "How to identify your competitors (It's Harder Than You Think)," Hoth Community Blog, Dec. 1, 2015, https://www.thehoth.com/blog/how-to-identify-your-competitors.*

* cited by examiner

*Primary Examiner* — Renae Feacher
(74) *Attorney, Agent, or Firm* — Schwegman Lundberg & Woessner, P.A.

(57) ABSTRACT

In an example embodiment, a machine-learning algorithm is used to train a talent peer model to output a score indicating a likelihood that one organization is a talent peer to another organization. Scores above a predetermined threshold indicate that the organization is a talent peer to the other organization.

20 Claims, 6 Drawing Sheets

MACHINE-LEARNING ALGORITHM FOR TALENT PEER DETERMINATIONS

TECHNICAL FIELD

The present disclosure generally relates to technical problems encountered in comparing entities using a computer system. More specifically, the present disclosure relates to the use of a machine-learning algorithm to determine talent peers for entities.

BACKGROUND

Computer systems are commonly used to provide information about businesses, either to those businesses themselves or to third parties. For example, analytical insights may be determined and presented to, for example, a sales team to sell services better to companies that are the subjects of the analytical insights. One area that is growing in popularity where such analytical insights are helpful is talent recruitment. Specifically, companies may not necessarily be aware of other companies with which they are competing for talent. Additionally, even if the companies themselves are aware of the other companies with which they compete for talent, third-party services, such as social networking services providing metrics and insights, might not.

Determining the companies with which a company competes for talent (also known as "talent peers") can be important for use in benchmarking companies across a number of metrics. Unless such talent peers are explicitly provided (e.g., by the company itself), they must be determined. Human-based determination of talent peers, however, cannot scale to the level necessary for a large-scale social network, where there are hundreds of thousands if not millions of companies listed. A computer-based solution for determining talent peers is needed. Such computer-based solutions, however, suffer from technical problems in that it can be difficult to determine which metrics may be relevant to such a determination and how much value to place on each metric.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a machine-learning algorithm is utilized to create a talent peer model that determines, for a given entity, a set of one or more other entities that can be considered "talent peers" for benchmarking analytical insights. In some example embodiments, the talent peer model outputs a score for a given entity-entity pair. This score may be based on, for example, talent flows, occupations, and regions. These three different talent-related areas will be described in more detail below.

Figure 1:
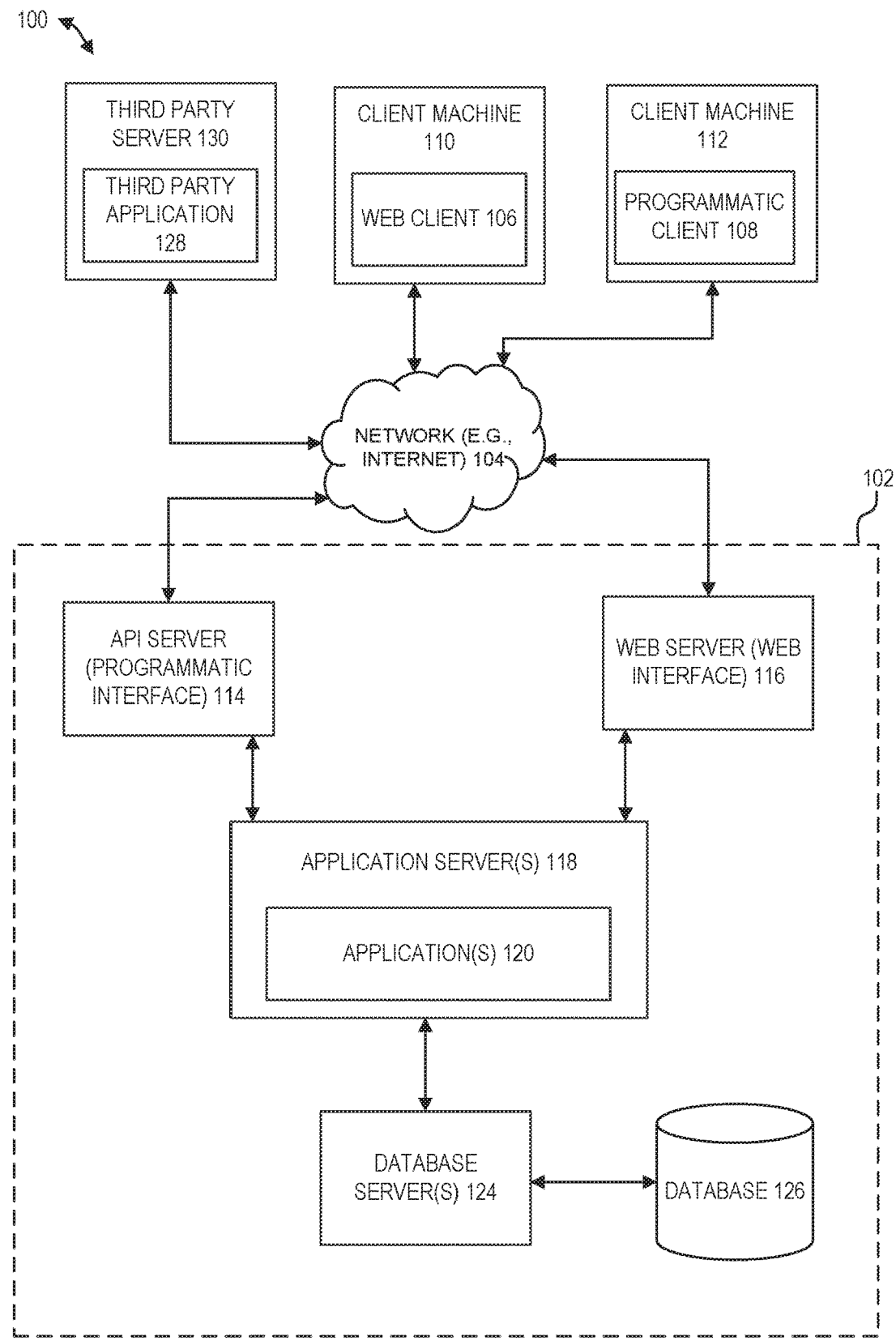
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server the API server 114) may communicate with the mobile app and the application server(s) 118 in order to make the features of the present disclosure available on the mobile device.

Figure 2:
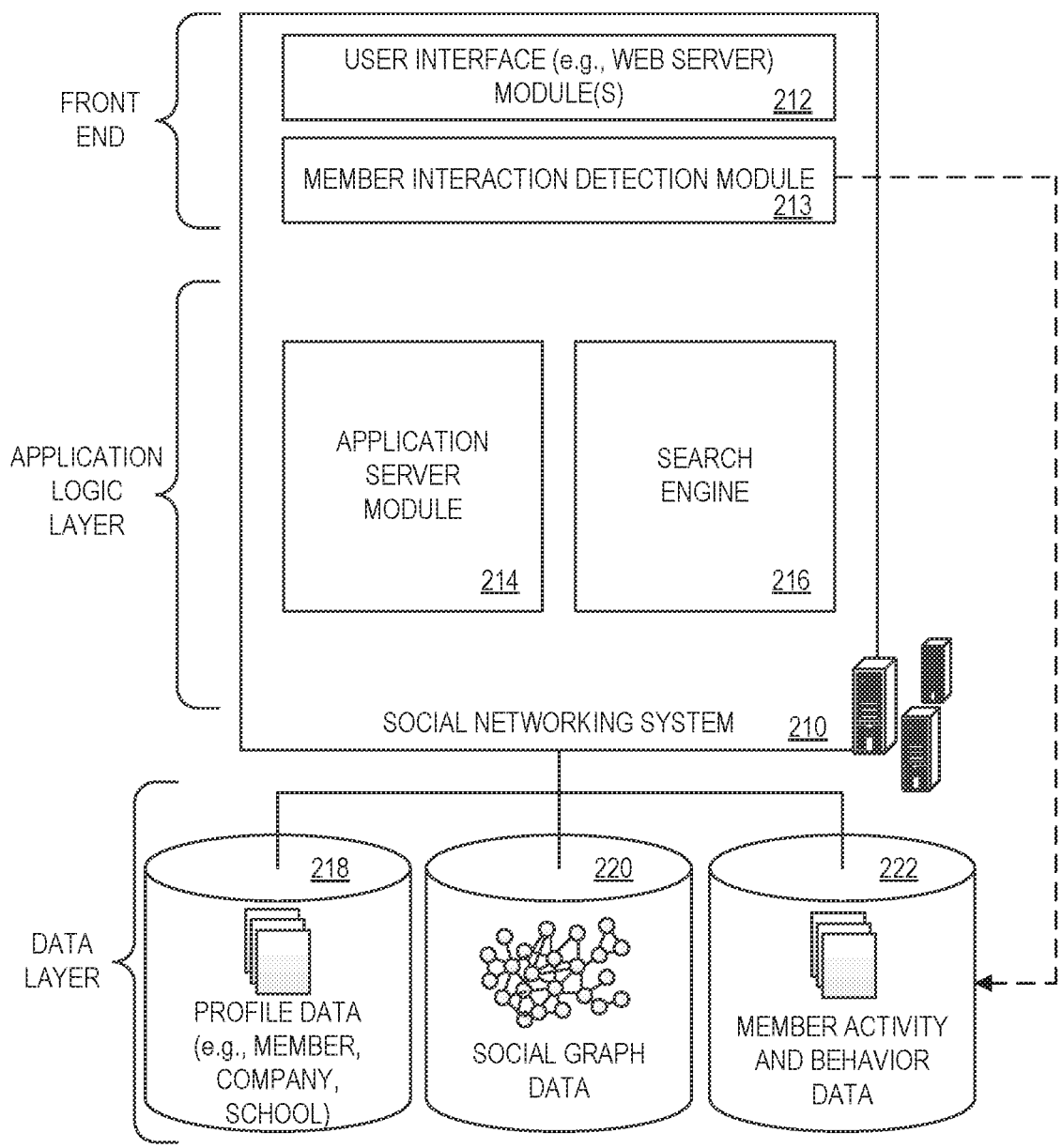
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown).

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing of and searching for content within the social networking service, such as the indexing of and searching for data or information contained in the data layer, such as profile data (stored, e.g., in the profile database 218), social graph data (stored, e.g., in the social graph database 220), and member activity and behavior data (stored, e.g., in the member activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

The members included in the social networking service may include organizations, such as businesses, charities, government agencies, etc. Collectively these organizations may be known as "entities."

Figure 3:
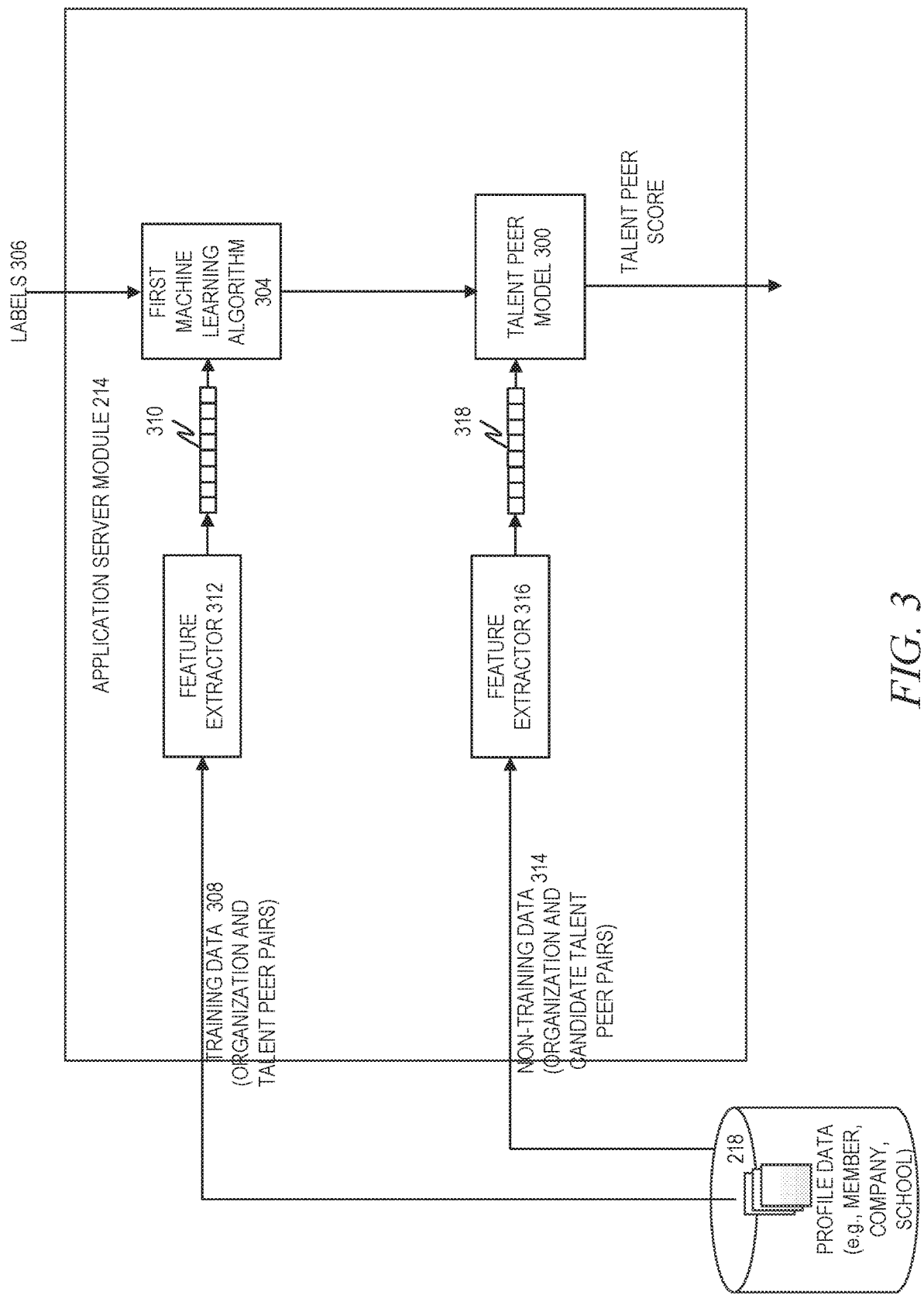
FIG. 3 is a block diagram illustrating an application server module of FIG. 2 in more detail, in accordance with an example embodiment.

FIG. 3 is a block diagram illustrating the application server module 214 of FIG. 2 in more detail, in accordance with an example embodiment. While in many embodiments the application server module 214 will contain many sub-components used to perform various different actions within the social networking system, in FIG. 3 only those components that are relevant to the present disclosure are depicted.

A talent peer model 300 is trained to utilize one or more features 318 of an organization and a candidate talent peer pair and output a talent peer score for this pair. The talent peer score represents the likelihood that the candidate talent peer is indeed a talent peer for the organization. Specifically, in a training phase, the talent peer model 300 is trained via a first machine-learning algorithm 304 to determine the similarity between the organization and the candidate talent peer on various metrics related to talent.

The first machine-learning algorithm 304 may be selected from among many different potential supervised or unsupervised machine-learning algorithms. Examples of supervised machine-learning algorithms include artificial neural networks, Bayesian networks, instance-based learning, support vector machines, random forests, linear classifiers, quadratic classifiers, k-nearest neighbors algorithms, decision trees, and hidden Markov models. Examples of unsupervised machine-learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors). In an example embodiment where a supervised machine-learning algorithm is used, labels 306 are provided to training data 308, and a set of features 310 for the labeled training data 308 is extracted by a feature extractor 312. The set of features 310 and the labels 306 are then fed to the first machine-learning algorithm 304 to train the talent peer model 300.

Then, in an evaluation phase, non-training data 314 may be used by a feature extractor 316 to extract a set of features 318. The set of features 318 may be of the same feature type as the set of features 310, although in some instances there may be differences. The features 318 may then be passed to the talent peer model 300, which outputs a talent peer score for each organization and candidate talent peer pair, reflecting the similarity, in terms of talent recruitment, between the organization and the corresponding candidate talent peer for the pair.

In an example embodiment, the features used in both the training and the evaluation phases of the talent peer model include talent flow features. Talent flow features are features that indicate whether the organization and the candidate talent peer in the pair hire from each other. Specifically, talent flow features may include job transition data from members of the social networking service, and specifically indications, for each job transition made by a member included in the training data, of which organization the member transitioned from and which organization the member transitioned to. From this information, a score may be generated reflecting the level at which the organization and the candidate talent peer hire from each other. In some example embodiments, this score may be based on a total number of transitions between the organization and the candidate talent peer. In other embodiments, this score may be based on the percentage of transitions involving the organization and the candidate talent peer that were between the organization and the candidate talent peer. Additionally, in some example embodiments, the score may be calculated with reference to the number or percentage of transitions between the organization and the candidate talent peer in comparison to that between the organization and other candidate talent peers, such as a ranking. In some example embodiments, this score is based on a logarithmic function. For purposes of this document, the score generated for talent flow can be termed a "talent flow score."

In an example embodiment, the features used in both the training and the evaluation phases of the talent peer model include occupation features. Occupation features are features that indicate what percentage of employees of the organization and the candidate talent peer belong to which occupations. The concept is that organizations that have similar percentages of occupations are more likely to be talent peers. For example, if an organization has 50% software developers and 40% business analysts, then a candidate talent peer that has 49% software developers and 41% business analysts is more likely to be a talent peer for the organization than a candidate talent peer having 40% software developers and 55% business analysts. This information may be extracted from member profiles. A score may then be assigned to each pair of organization and candidate talent peer. For purposes of this document, this score may be termed an "occupation score." In some example embodiments, the occupation score is based on a Euclidean distance formula using the distances between hypothetical points representing the percentages of various occupations. It should also be noted that in some example embodiments certain occupations may be excluded from this analysis. This may include occupations that are found in most organizations, such as Chief Executive Officer and Human Resources Director, as well as occupations that are simply found to be irrelevant for determining talent peers, such as security personnel or parking attendants.

In an example embodiment, the features used in both the training and the evaluation phases of the talent peer model include location features. Location features indicate a location of members associated with the organization and with the candidate talent peer. For example, if an organization has 50% of its employees in New York City and 50% in Chicago, then a candidate talent peer that has 49% of its employees in New York City and 51% in Chicago is more likely to be a talent peer for the organization than a candidate talent peer having 25% of its employees in New York City and 55% of its employees in Chicago. A score may then be assigned to each pair of organization and candidate talent peer. For purposes of this document, this score may be termed a "location score." In some example embodiments, the location score is based on a Euclidean distance formula using the distances between hypothetical points representing the percentages of various locations (not the geographic distances between the locations themselves).

The talent flow score, occupation score, and location score may then be combined into a single talent peer score for the organization/candidate talent peer pair. This combination may be accomplished by weighting the talent flow score, occupation score, and location score. In some example embodiments, the machine-learning algorithm described earlier trains the talent peer model by training the values for these weights.

Additionally, there may be several types of features that are used for negative correlations between organizations and candidate talent peers. In one example embodiment, organization size is one such negative feature. If the size of the organization differs too much from the size of the candidate talent peer (e.g., one has 10,000 employees and the other has 900), then the talent peer score for this pair may be reduced. In another example embodiment, if the broader industry groupings for the organization and the candidate talent peer differ (e.g., technology/software versus telecommunications), then the talent peer score for this pair may be reduced. In another example embodiment, if the sub-industry for the organization and the candidate talent peer differ (e.g., pharmaceuticals versus medical devices), then the talent peer score for this pair may be reduced. These reductions may also be assigned weights which can be learned by the machine-learning algorithm described above.

In another example embodiment, granularity of one or more of the above-described features may be learned via a separate, second machine-learning algorithm. For example, location features can vary in granularity from the city level to the state level to the region level to the country level. Which granularity is chosen can greatly affect the location score. For example, Los Angeles and San Francisco are different locations at the city level, but in the same location (California) at the state level. Los Angeles and San Francisco may be distinct enough markets to treat them differently, and thus for these locations the second machine-learning algorithm may learn that the city level is the appropriate granularity at which to measure. Other cities, however, may not be distinct enough markets to treat them differently, such as Salt Lake City and Provo, and in such instances the more appropriate granularity may be at the state level. The second machine-learning algorithm may be used to train a model to determine the appropriate granularity for a given set of cities. It should be noted that this appropriate granularity can vary across multiple dimensions. For example, while two cities might be considered separate markets for one type of occupation, those same two cities might not be considered separate markets for another type of occupation. The second machine-learning algorithm may use features that permit such variations to be captured in the model.

Once talent peer scores have been determined for multiple pairs including a given organization, these talent peer scores may be used to determine the talent peers for the given organization by, for example, comparing the talent peer scores to a predetermined threshold. Organizations in pairs having talent peer scores exceeding the predetermined threshold may be determined to be talent peers for the given organization.

Figure 4:
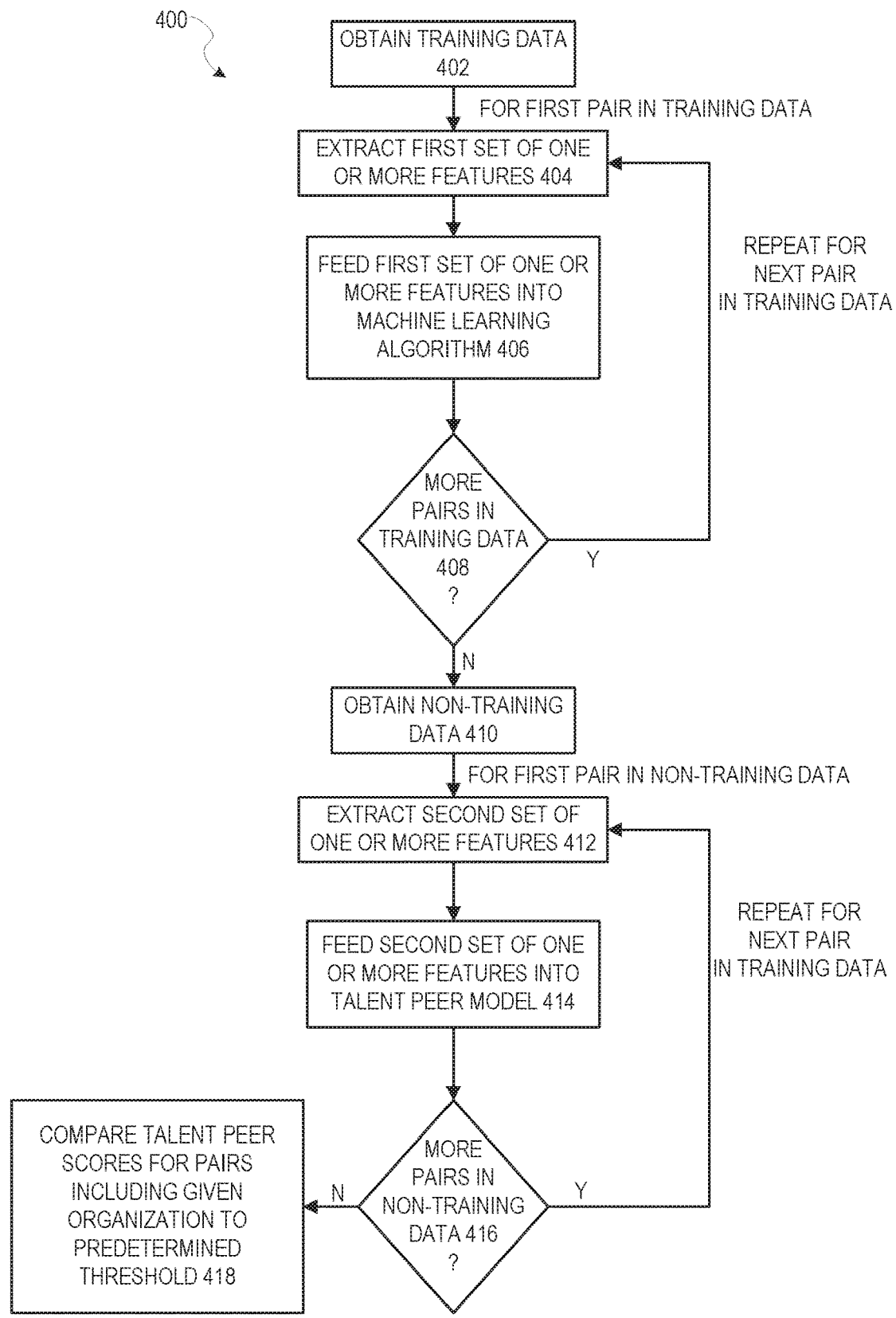
FIG. 4 is a flow diagram illustrating a method of using a machine-learning algorithm, in accordance with an example embodiment.

FIG. 4 is a flow diagram illustrating a method 400 of using a machine-learning algorithm, in accordance with an example embodiment. At operation 402, in a training phase, training data pertaining to sample member data in a social networking service is obtained. The sample member data includes information about a first plurality of organizations. This member data may, include, for example, member profiles in the social networking service, for members who are employees of one of the first plurality of organizations. A loop is then repeated for each pair of organizations in the first plurality of organizations. The pairs are determined by identifying various permutations of pairs identified in the sample member data (in some example embodiments the pairs may represent each and every combination of organizations in the member data). At operation 404, a first set of one or more features is extracted from corresponding training data. At operation 406, the first set of one or more features is fed into a machine-learning algorithm to train a talent peer model to output a talent peer score indicating a likelihood that the organizations in the pair are talent peers. At operation 408, it is determined if there are any more pairs of organizations in the first plurality of organizations. If so, the method 400 loops back to operation 404 for the next pair of organizations in the first plurality of organizations. If not, then the training phase is complete.

At operation 410, in an evaluation phase, a plurality of non-training member data is obtained. The non-training member data includes information about a second plurality of organizations. A loop is then repeated for each pair of organizations in the second plurality of organizations. At operation 412, a second set of one or more features is extracted from corresponding non-training data. At operation 414, the second set of one or more features is fed into the talent peer model to obtain a talent peer score for the pair. At operation 416, it is determined if there are any more pairs of organizations in the second plurality of organizations. If so, the method 400 loops back to operation 412 for the next pair of organizations in the second plurality of organizations. If not, at operation 418, for a given organization represented in the non-training member data, talent peer scores for pairs including the given organization are compared to a predetermined threshold, with organizations in pairs having talent peer scores exceeding the predetermined threshold being determined to be talent peers for the given organization.

Figure 5:
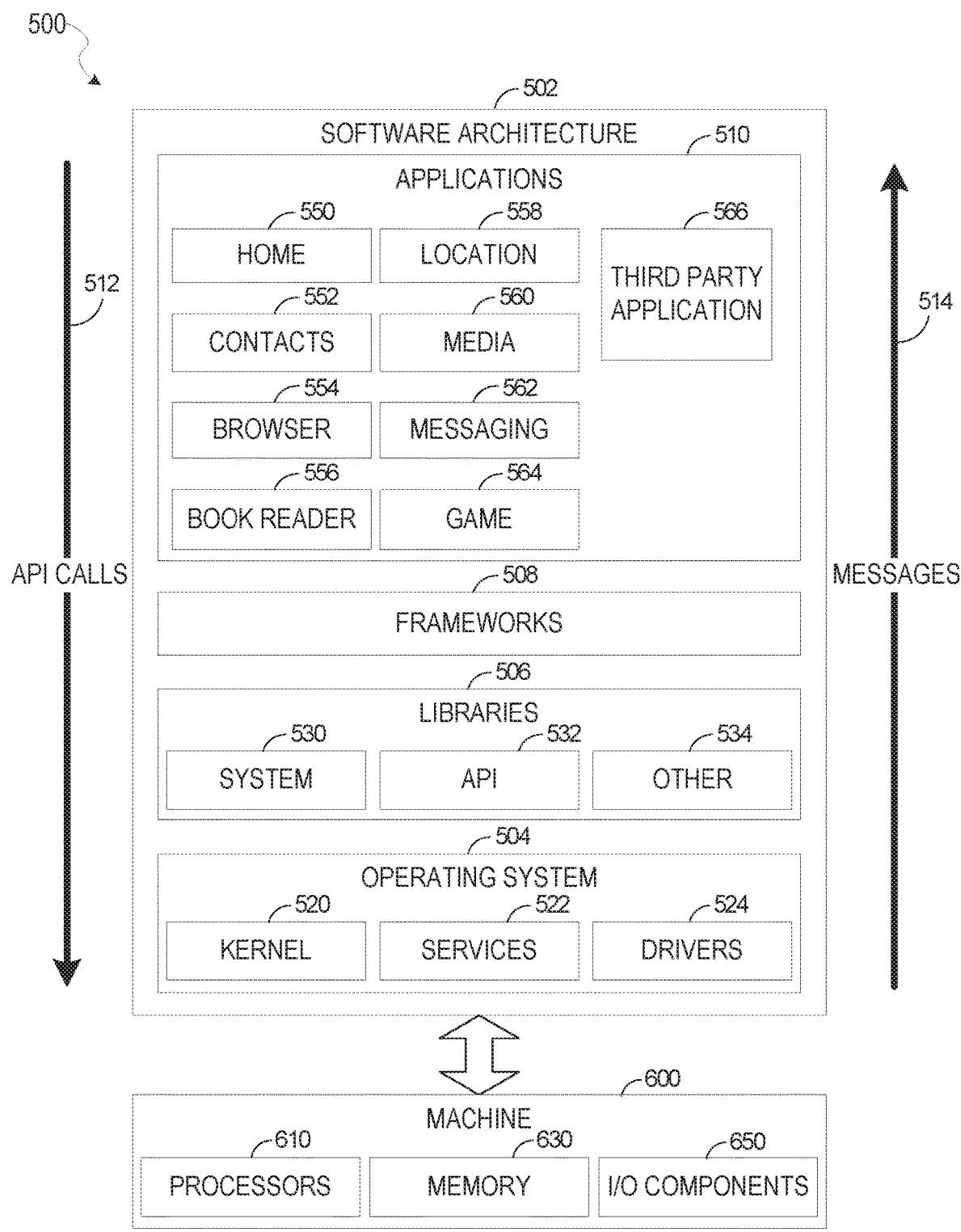
FIG. 5 is a block diagram illustrating a representative software architecture, which may be used in conjunction with various hardware architectures herein described.

FIG. 5 is a block diagram 500 illustrating an architecture of software 502, which can be installed on any one or more of the devices described above. FIG. 5 is merely a non-limiting example of a software architecture, and it will be appreciated that many other architectures can be implemented to facilitate the functionality described herein. In various embodiments, the software 502 is implemented by hardware such as a machine 600 of FIG. 6 that includes processors 610, memory 630, and I/O components 650. In this example architecture, the software 502 can be conceptualized as a stack of layers where each layer may provide a particular functionality. For example, the software 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system or platform.

In an example embodiment, the applications 510 include a home application 550, a contacts application 552, a browser application 554, a book reader application 556, a location application 558, a media application 560, a messaging application 562, a game application 564, and a broad assortment of other applications such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 566 can invoke the API calls 512 provided by the operating system 504 to facilitate functionality described herein.

Figure 6:
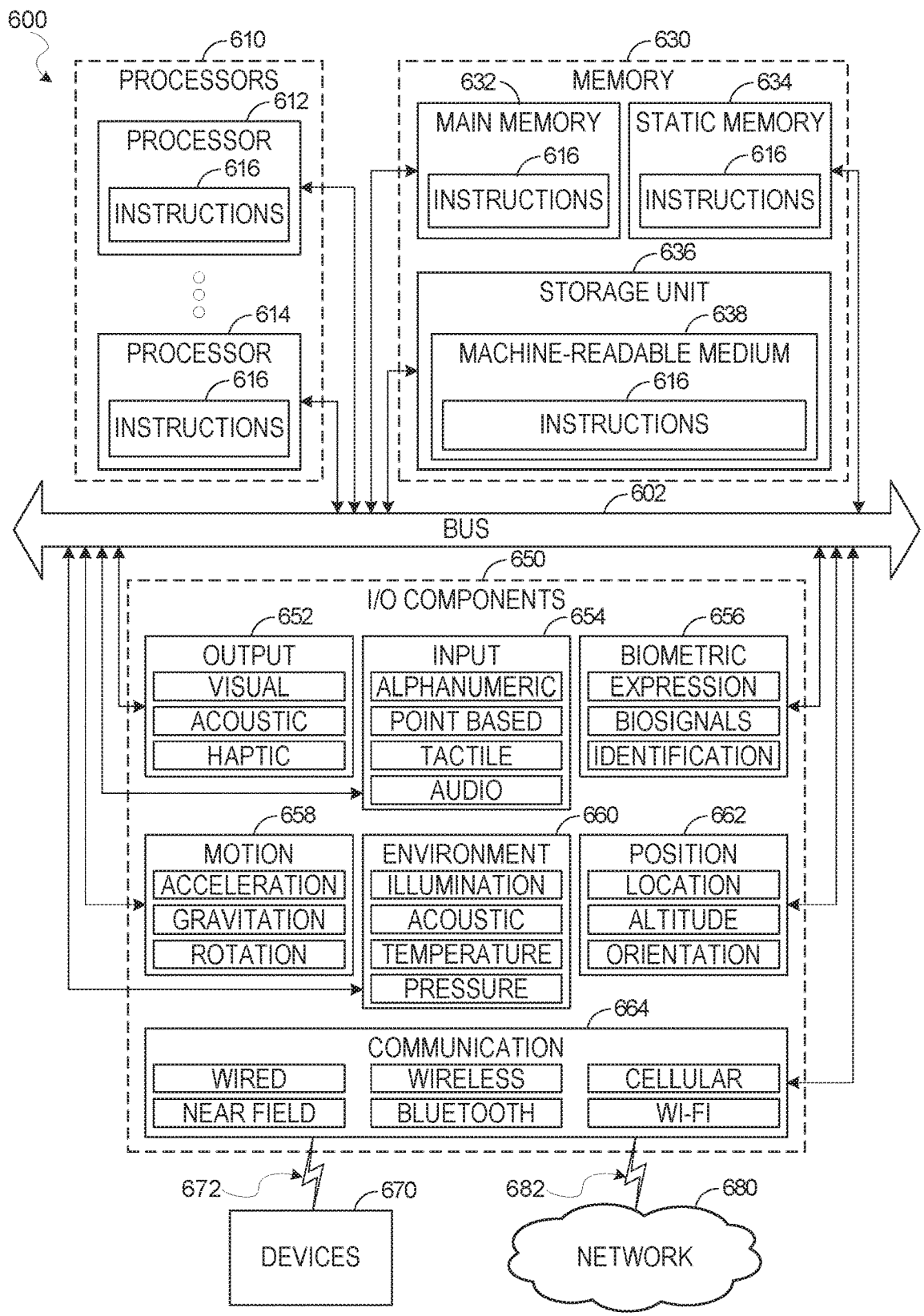
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 illustrates a diagrammatic representation of a machine 600 in the form of a computer system within which a set of instructions may be executed for causing the machine to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an apples, an app, or other executable code) for causing the machine 600 to perform any one or more of the methodologies discussed herein may be executed. For example the instructions 616 may cause the machine 600 to execute the method 400 of FIG. 4. Additionally, or alternatively, the instructions 616 may implement FIGS. 1-4, and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory 630 may include a main memory 632, a static memory 634, and a storage unit 636, both accessible to the processors 610 such as via the bus 602. The main memory 630, the static memory 634, and storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 630, 632, 634, and/or memory of the processor(s) 610) and/or storage unit 636 may store one or more sets of instructions and data structures (e.g., software) embodying or utilized by any one or more of the methodologies or functions described herein. These instructions (e.g., the instructions 616), when executed by processor(s) 610, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:
1. A system comprising:
a computer-readable medium having instructions stored thereon, which, when executed by a processor, cause the system to:
in a training phase:
obtain training data pertaining to sample member data in a social networking service, the sample member data including information about a first plurality of organizations, the first plurality of organizations comprising a first group of a plurality of pairs of organizations; and
for each pair of organizations in the first group, extract a first set of one or more features from corresponding training data and feed the first set of one or more features into a machine-learning algorithm to train a talent peer model to output a talent peer score indicating a likelihood that the organizations in the pair are talent peers that compete for talent, the first set of one or more features including at least one talent flow feature indicating talent transfer between the organizations in the pair, at least one occupation feature indicating what percentages of employees of the organizations in the pair belong to which occupations, and at least one location feature indicating what percentages of employees of the organizations in the pair are at which locations; and
in an evaluation phase:
obtain a plurality of non-training member data, the non-training member data including information about a second plurality of organizations, the second plurality of organizations comprising a second group of a plurality of pairs of organizations;
for each pair of organizations in the second group, extract a second set of one or more features from corresponding non-training member data and feed the second set of one or more features into the trained talent peer model to obtain a talent peer score for the pair of organizations in the second group;
for a given organization represented in the non-training member data, compare the talent peer scores for the pairs of organizations including the given organization to a predetermined threshold; and
identify organizations in the plurality of pairs of organizations in the first plurality of organizations and in the second plurality of organizations having talent peer scores exceeding the predetermined threshold as talent peers that compete with the given organization for talent.
2. The system of claim 1, wherein the machine-learning algorithm learns weights assigned to the at least one talent flow feature, at least one occupation feature, and at least one location feature.
3. The system of claim 1, wherein the at least one talent flow feature is how much the organizations in the pair hire from each other.
4. The system of claim 1, wherein the at least one occupation feature is a breakdown of percentages of total employees of each organization in the pair who have particular occupations.
5. The system of claim 1, wherein the at least one location feature includes a percentage of total employees of each organization in the pair who are located in particular areas.
6. The system of claim 1, wherein the second set of features is identical to the first set of features.
7. The system of claim 1, wherein the instructions further cause the system to use a second machine-learning algo- rithm to train a granularity model to output a granularity at which to measure the at least one location feature.

8. A method comprising:

in a training phase:

obtaining training data pertaining to sample member data in a social networking service, the sample member data including information about a first plurality of organizations, the first plurality of organizations comprising a first group of a plurality of pairs of organizations; and for each pair of organizations in the first group, extracting a first set of one or more features from corresponding training data and feeding the first set of one or more features into a machine-learning algorithm to train a talent peer model to output a talent peer score indicating a likelihood that the organizations in the pair are talent peers that compete for talent, the first set of one or more features including at least one talent flow feature indicating talent transfer between the organizations in the pair, at least one occupation feature indicating what percentages of employees of the organizations in the pair belong to which occupations, and at least one location feature indicating what percentages of employees of the organizations in the pair are at which locations; and in an evaluation phase:

obtaining a plurality of non-training member data, the non-training member data including information about a second plurality of organizations, the second plurality of organizations comprising a second group of a plurality of pairs of organizations;

for each pair of organizations in the second group, extracting a second set of one or more features from corresponding non-training member data and feed the second set of one or more features into the trained talent peer model to obtain a talent peer score for the pair of organizations in the second group;

for a given organization represented in the non-training member data, comparing the talent peer scores for the pairs of organizations including the given organization to a predetermined threshold; and identifying organizations in the plurality of pairs of organizations in the first plurality of organization and in the second plurality of organizations having talent peer scores exceeding the predetermined threshold as talent peers that compete with the given organization for talent.

9. The method of claim 8, wherein the machine-learning algorithm learns weights assigned to the at least one talent flow feature, at least one occupation feature, and at least one location feature.

10. The method of claim 8, wherein the at least one talent flow feature is how much the organizations in the pair hire from each other.

11. The method of claim 8, wherein the at least one occupation feature is a breakdown of percentages of total employees of each organization in the pair who have particular occupations.

12. The method of claim 8, wherein the at least one location feature includes a percentage of total employees of each organization in the pair who are located in particular areas.

13. The method of claim 8, wherein the second set of features is identical to the first set of features.

14. The method of claim 8, further comprising using a second machine-learning algorithm to train a granularity model to output a granularity at which to measure the at least one location feature.

15. A non-transitory machine-readable storage medium comprising instructions, which when implemented by one or more machines, cause the one or more machines to perform operations comprising:

in a training phase:

obtaining training data pertaining to sample member data in a social networking service, the sample member data including information about a first plurality of organizations; and for each pair of organizations in the first plurality of organizations, extracting a first set of one or more features from corresponding training data and feeding the first set of one or more features into a machine-learning algorithm to train a talent peer model to output a talent peer score indicating a likelihood that the organizations in the pair are talent peers that compete for talent, the first set of one or more features including at least one talent flow feature indicating talent transfer between organizations in the pair, at least one occupation feature indicating what percentages of employees of the organizations in the pair belong to which occupations, and at least one location feature indicating what percentages of employees of the organizations in the pair are at which locations; and in an evaluation phase:

obtaining a plurality of non-training member data, the non-training member data including information about a second plurality of organizations;

for each pair of organizations in the second plurality of organizations, extracting a second set of one or more features from corresponding non-training member data and feed the second set of one or more features into the trained talent peer model to obtain a talent peer score for the pair;

for a given organization represented in the non-training member data, comparing talent peer scores for pairs including the given organization to a predetermined threshold; and identifying organizations in the pairs of organizations in the first plurality of organization and in the second plurality of organizations having talent peer scores exceeding the predetermined threshold as talent peers that compete with the given organization for talent.

16. The non-transitory machine-readable storage medium of claim 15, wherein the machine-learning algorithm learns weights assigned to the at least one talent flow feature, at least one occupation feature, and at least one location feature.

17. The non-transitory machine-readable storage medium of claim 15, wherein the at least one talent flow feature is how much the organizations in the pair hire from each other.

18. The non-transitory machine-readable storage medium of claim 15, wherein the at least one occupation feature is a breakdown of percentages of total employees of each organization in the pair who have particular occupations.

19. The non-transitory machine-readable storage medium of claim 15, wherein the at least one location feature includes a percentage of total employees of each organization in the pair who are located in particular areas.

20. The non-transitory machine-readable storage medium of claim 15, wherein the second set of features is identical to the first set of features.

* * * * *